(12) United States Patent
Sanciangco et al.

(10) Patent No.: US 11,868,611 B2
(45) Date of Patent: *Jan. 9, 2024

(54) PROVIDING A REMOTE KEYBOARD SERVICE

(71) Applicant: Apple Inc., Cupertino, CA (US)

(72) Inventors: Alexander D. Sanciangco, Cupertino, CA (US); Bob Bradley, San Jose, CA (US); Marc Krochmal, Santa Clara, CA (US); Graham Clarke, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/066,187

(22) Filed: Dec. 14, 2022

(65) Prior Publication Data

US 2023/0122528 A1 Apr. 20, 2023

Related U.S. Application Data

(63) Continuation of application No. 17/525,383, filed on Nov. 12, 2021, now Pat. No. 11,561,693, which is a
(Continued)

(51) Int. Cl.
G06F 3/04886 (2022.01)
G06Q 30/0241 (2023.01)
(Continued)

(52) U.S. Cl.
CPC ..... *G06F 3/04886* (2013.01); *G06Q 30/0241* (2013.01); *H04M 1/72412* (2021.01);
(Continued)

(58) Field of Classification Search
CPC .. G06F 3/04886; G06F 9/451; G06F 3/04895; H04W 4/80; H04W 4/00;
(Continued)

(56) References Cited

U.S. PATENT DOCUMENTS 10,126,945 B2 11/2018 Sanciangco et al.
10,331,343 B2 6/2019 Sanciangco et al.
(Continued)

FOREIGN PATENT DOCUMENTS

CN 104391576 A 3/2015
CN 105432091 A 3/2016
(Continued)

OTHER PUBLICATIONS

Apple Inc.: "Text, Web, and Editing Programming Guide for iOS", Jan. 10, 2011, pp. 1-74.
(Continued)

*Primary Examiner* — Muhammad N Edun
(74) *Attorney, Agent, or Firm* — Invoke

(57) ABSTRACT

The systems described herein provide a remote keyboard service for a media device on a computing device without having to invoke an application or unlock the computing device. The computing device can receive a message indicating that a text input field on the other device is selected and present a notification to the user prompting the user to invoke the virtual keyboard on the computing device to provide text input to the selected text input field. The computing device can receive user input selecting the notification and present a virtual keyboard for providing text input to the other device. The computing device can receive keyboard input from the user selecting characters and send the characters to the other device. The other device can then user the characters as text input to the selected text input field.

20 Claims, 7 Drawing Sheets

Related U.S. Application Data continuation of application No. 16/851,351, filed on Apr. 17, 2020, now Pat. No. 11,204,695, which is a continuation of application No. 16/448,534, filed on Jun. 21, 2019, now Pat. No. 10,664,161, which is a continuation of application No. 16/155,159, filed on Oct. 9, 2018, now Pat. No. 10,331,343, which is a continuation of application No. 15/272,010, filed on Sep. 21, 2016, now Pat. No. 10,126,945.

(60) Provisional application No. 62/348,771, filed on Jun. 10, 2016.

(51) Int. Cl.
*H04M 1/72412* (2021.01)
*H04W 12/06* (2021.01)
*H04W 12/086* (2021.01)
*H04N 21/41* (2011.01)
*H04W 4/00* (2018.01)
*H04W 4/80* (2018.01)
*G06F 3/04895* (2022.01)
*H04N 21/422* (2011.01)
*G06F 9/451* (2018.01)
*G06Q 30/00* (2023.01)

(52) U.S. Cl.
CPC ... *H04N 21/4126* (2013.01); *H04N 21/41265* (2020.08); *H04W 4/00* (2013.01); *H04W 4/80* (2018.02); *H04W 12/068* (2021.01); *H04W 12/086* (2021.01); *G06F 3/04895* (2013.01); *G06F 9/451* (2018.02); *G06Q 30/00* (2013.01); *H04N 21/42212* (2013.01)

(58) Field of Classification Search
CPC ... H04W 12/06; H04W 12/08; H04W 12/068; H04W 12/086; H04N 21/42212; H04N 21/4126; G06Q 30/00; G06Q 30/0241; H04M 1/72412

See application file for complete search history.

(56) References Cited

U.S. PATENT DOCUMENTS

| | | |
|---|---|---|
| 2009/0161579 A1 | 6/2009 | Saaranen et al. |
| 2013/0024777 A1 | 1/2013 | Brakensiek et al. |
| 2013/0318468 A1 | 11/2013 | Lee |
| 2014/0189068 A1 | 7/2014 | Kim |
| 2014/0364056 A1 | 12/2014 | Belk et al. |
| 2015/0143234 A1 | 5/2015 | Norris, III |
| 2015/0189461 A1 | 7/2015 | Pang et al. |
| 2016/0048217 A1 | 2/2016 | Sakita |
| 2016/0085430 A1 | 3/2016 | Moran et al. |
| 2017/0200021 A1 | 7/2017 | Patel et al. |

FOREIGN PATENT DOCUMENTS

| | | |
|---|---|---|
| EP | 3440537 A1 | 2/2019 |
| JP | 2013-162202 A | 8/2013 |
| JP | 2014-068240 A | 4/2014 |
| JP | 2014-137671 A | 7/2014 |
| JP | 2014-521179 A | 8/2014 |
| JP | 2015-038665 A | 2/2015 |
| JP | 2015-141487 A | 8/2015 |
| JP | 2016-162010 A | 9/2016 |
| KR | 10-2011-0039034 A | 4/2011 |
| KR | 10-2014-0086227 A | 7/2014 |
| KR | 10-2016-0006753 A | 1/2016 |
| WO | 2012/070682 A1 | 5/2012 |
| WO | 2017/213836 A1 | 12/2017 |

OTHER PUBLICATIONS

Hinrichs, "Examination of text-entry methods for tabletop displays," 2nd IEEE International Workshop on Horizontal Interactive Human-Computer Systems, Tabletop 2007, Oct. 10-12, 2007, pp. 105-112.

PROVIDING A REMOTE KEYBOARD SERVICE

CROSS-REFERENCE TO RELATED APPLICATIONS

Each of the following applications are hereby incorporated by reference: application Ser. No. 17/525,383 filed on Nov. 12, 2021; application Ser. No. 16/851,351 filed on Apr. 17, 2020; application Ser. No. 16/448,534 filed on Jun. 21, 2019; application Ser. No. 16/155,159 filed on Oct. 9, 2018; application Ser. No. 15/272,010 filed on Sep. 21, 2016; application Ser. No. 62/348,771 filed on Jun. 10, 2016. The Applicant hereby rescinds any disclaimer of claim scope in the parent application(s) or the prosecution history thereof and advises the USPTO that the claims in this application may be broader than any claim in the parent application.

TECHNICAL FIELD

The disclosure generally relates to coordinating services between different devices.

BACKGROUND

Streaming media devices are becoming more and more popular. Streaming media devices allow a user to browse, search, and watch media content on demand. However, the input mechanisms for these streaming media devices are often simple remote controls without keyboards that require a user to hunt and select individual text characters when entering a search query into a text input control (e.g., text input box). Thus, the process of providing textual input to these streaming media devices can be burdensome to the user.

Some streaming media devices have a corresponding application by which a user can provide text input using a virtual keyboard on the user's handheld device (e.g., smartphone, tablet computer, etc.). However, the user must install and invoke the application before being able to use the virtual keyboard to provide text input to the streaming media device.

SUMMARY

The systems described herein provide a remote keyboard service for a media device on a separate computing device without having to invoke an application or unlock the computing device. The computing device can receive a message indicating that a text input field on the other device is selected and present a notification to the user prompting the user to invoke the virtual keyboard on the computing device to provide text input to the selected text input field. The computing device can receive user input selecting the notification and present a virtual keyboard for providing text input to the other device. The computing device can receive keyboard input from the user selecting characters and send the characters to the other device. The other device can then user the characters as text input to the selected text input field.

Particular implementations provide at least the following advantages. A remote virtual keyboard can be provided by user devices without having to invoke a specific application. The remote virtual keyboard can be provided even when the user's device is locked. Because the need for the keyboard is advertised to all user devices, the user can select the user device most convenient to the user.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

Overview

Examples of a method, apparatus, and computer program for providing a remote keyboard service on a user device are disclosed below. In the following description, for the purposes of providing explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
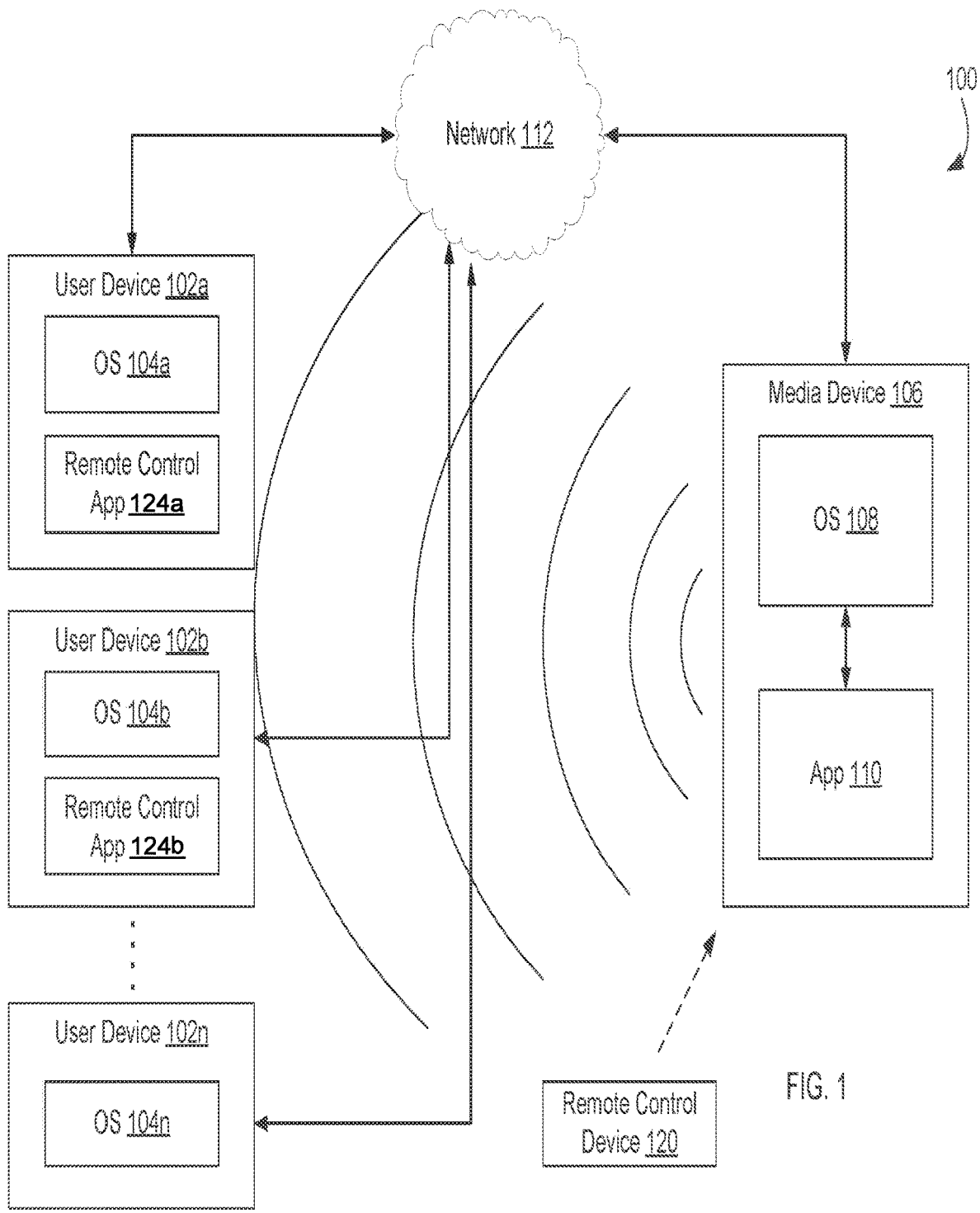
FIG. 1 is a block diagram of an example system 100 for providing a remote keyboard service on a user device.

FIG. 1 is a block diagram of an example system 100 for providing a remote keyboard service on a user device. In some implementations, system 100 can include user devices 102 (e.g., 102a, 102b . . . 102n). For example, user device 102a can be a computing device, such as a smartphone, tablet computer, television, desktop computer, laptop computer, household device, electronic book device, game device, smart watch, smart glasses and/or other mobile or wearable device, the accessories and peripherals of these devices, or any combination thereof.

In some implementations, user devices 102 (e.g., user device 102a, user device 102b . . . user device 102n) can be configured with respective operating systems 104 that provide a variety of services and features. For example, operating systems 104 can be configured to receive and decode state advertising messages (e.g., Bluetooth packets, Bluetooth LE packets, etc.) from different devices within close proximity of user devices 102. The state advertising messages can include information describing the current state of other devices, including the availability of different services, data necessary for the coordination of processing between different devices, and/or requests for information and/or services from other devices. For example, user device 102a can receive state advertising messages from user device 102b and/or 102n describing the current state of these devices.

In some implementations, user devices 102 can receive state advertising messages from media device 106. For example, media device 106 can be a computing device, such as a streaming media player, a set top box, a smart television, a laptop computer, or other computing device. The user of user devices 102 may interact with media device 106 to browse and search for media items to play and/or other content to view. For example, media device 106 can present graphical user interfaces on a display (e.g., television, computer monitor, etc.) connected to media device 106 that allow the user to browse, search, and select media items (e.g., movies, websites, images, photos, etc,) for media device 106 to present on the display of media device 106.

In some implementations, media device 106 may require text input from the user. For example, media device 106 may require text input from the user when searching for media items. Media device 106 may require text input from the user when logging into a subscription service that requires the user's login credentials. Sometimes operating system 108 of media device 106 will require some text input. For example, media device 106 can present a prompt and a text input control on the display of media device 106 for receiving network configuration input, login credentials, etc. Sometimes application 110 (e.g., a media content provider software application, video application, music application, gaming application, weather application, etc.) will present a prompt and a text input control for receiving text input from the user. For example, application 110 may provide a media item search feature that allows the user to input text that defines a search query.

In some implementations, a user can provide text input using a remote control device 120. For example, media device 106 may have been sold with or work with a remote control device 120 with a few directional buttons and a select button to move a cursor on media device 106 and select items on a display. Sometimes remote control device 120 can have a touch interface and remote control device 120 can receive touch input gestures (e.g., swipe up, swipe down, swipe left, swipe right, tap, etc.) to move a cursor on media device 106 and select items on a display. When providing text input to media device 106 with remote control device 120, the user typically has to use the remote control device 120 to move a cursor over an array of characters presented on a graphical user interface and select one character at a time until the appropriate string is built. This process can be slow a burdensome to the user and generally results in a frustrated user if the user has to perform this hunt-and-peck process repeatedly to find a media item the user would like for media device 106 to play.

To solve the above problem with entering text with remote control device 120, user devices 102 can be configured with remote control applications 124 (e.g., 124a, 124b) for remotely interacting with media device 106. For example, remote control applications can control media device 106 over network 112. Network 112 can be, for example, a local area network, wide area network, local Wi-Fi network, adhoc peer-to-peer network, etc. Network 112 can be implemented using internee protocol, Bluetooth, Bluetooth Low Energy, or any other networking protocol.

In some implementations, remote control applications 124 can be configured to provide similar functionality as remote control device 120. For example, remote control applications 124 can present on a display of user devices 102 directional controls for moving a cursor and a selection control for selecting an item presented by media device 106. However, remote control applications 124 can also provide a virtual keyboard that the user can use to provide textual input to media device 106. For example, the virtual keyboard can be presented by remote control application 124a on a touch sensitive display of user device 102a and the user can type on the virtual keyboard to select characters and create strings corresponding to the required textual input. User device 102a can then send the textual input to media device 106 through network 112. Media device 105 can then use the textual input to perform a search, configure operating system 108, configure application 110, or for any other purpose.

While providing text input to the virtual keyboard provided by remote control application 124 is an improvement over entering text using remote control device 120, the user is still burdened with unlocking user device 102a and invoking remote control application 124a before being able to access and use the virtual keyboard to provide textual input to media device 106. Thus, in some implementations, operating system 104a of user device 102a can provide a virtual keyboard service for providing text input to media device 106. For example, user device 102a can provide the virtual keyboard service without unlocking user device 102a. User device 102a can provide the virtual keyboard service without invoking remote control application 124a.

In some implementations, media device 106 can broadcast a remote keyboard service request to connect to a remote keyboard service provided by user devices 102. For example, the remote keyboard service request can be (e.g., part of) a device state advertising message indicating that a text input control has been selected on media device 106. For example, when the user is interacting with media device 106 (e.g., using remote control device 120) and selects a text input field, media device 106 can generate a state advertising message indicating that the text input field has been selected. For example, if application 110 is presenting a media item search graphical user interface, the user may select a text input control on the graphical user interface so that the user can provide a search query. In response to selecting the text input control, application 110 can invoke an application programming interface (API) of operating system 108 to request keyboard support for providing input to the selected text input control.

If operating system 108 is presenting a configuration graphical user interface requiring text input, the user may select a text input control on the graphical user interface so that the user can provide the appropriate configuration string (e.g., network identifier, account credentials, etc.). In response to selecting the text input control, operating system 108 can invoke an API of operating system 108 to request keyboard support for providing input to the selected text input control. When the keyboard support API is invoked, operating system 108 can generate a state advertising message that includes data indicating that a text input control has been selected on media device 106. For example, the state advertising message can include an identifier for media device 106, an identifier for application 110, data (e.g., true/false) indicating that the text input control has been selected, data describing the text input control or the text input to be provided by the user, and/or text input already provided by the user to media device 106. The state advertising message data can be encoded into and decoded from the state advertising message using a state advertising message schema as described in U.S. patent application Ser. No. 15/179,676 which is hereby incorporated by reference in its entirety.

In some implementations, media device 106 can broadcast the generated state advertising message. For example, media device 106 can broadcast the generated state advertising message using a wireless (e.g., peer-to-peer) technology, such as Bluetooth, Bluetooth Low Energy, peer-to-peer Wi-Fi, or some other wireless technology. The state advertising message can, for example, be broadcasted without selecting a specific recipient device. For example, any user devices (e.g., user devices 102) within range of the wireless signal transmitted by media device 106 can receive and/or process the advertising message generated by media device 106. Alternatively, only user devices associated with the same user account (e.g., a subscriber account, cloud service account, etc.) as the sending device can receive and decode messages from the sending device. Alternatively, the sending and/or receiving devices do not have to be associated with the same user and/or same user account. For example, user devices 102 and media device 106 can all be associated with different user accounts or no user account. User devices 102 and media device 106 can be different types of computing devices, from different manufacturers, with different configurations, and/or different operating systems.

In some implementations, user devices 102 can receive the broadcasted state advertisement message. For example, user devices 102 (e.g., user device 102a, user device 102b, . . . user device 102n) within the broadcast range of media device 106 can receive the state advertisement message. In response to receiving the state advertisement message, user devices 102 can determine based on the state data in the state advertisement message that the text input control on media device 106 is currently selected. When user devices 102 determine that the text input control is selected on media device 106, operating systems 104 on user devices 102 will present a graphical notification on the respective devices prompting the user to invoke a virtual keyboard. For example, if the user has user device 102a (e.g., smartphone), user device 102b (e.g., laptop), and user device 102n (e.g., tablet) all within the broadcasting range of media device 106, all these devices can determine the text input control on media device 106 is currently selected based on the state advertisement message and all these user devices can present the graphical notification prompting the user to invoke the virtual keyboard on each of these user devices.

In some implementations, user devices 102 (e.g., user device 102a, user device 102b, . . . user device 102n) can present the keyboard notification on the screen of the user device even when the screen of the user device is locked. For example, user devices 102 can present the remote keyboard notification upon receiving the state advertisement message being broadcasted from media device 106.

Continuing the above example, assuming the user has user device 102a within the broadcasting range of the media device 106, user device 102a can present the remote keyboard notification on a display of user device 102a. After the user selects the notification on user device 102a (e.g., by touching, swiping, etc. the notification), user device 102a can establish a bidirectional communication session with media device 106 through communication network 112. For example, communication network 112 may include various networks such as a data network, a wireless network, a telephony network, or any combination thereof. After user device 102a responds to the remote keyboard service request (e.g., embodied in the state advertisement message), media device 106 can broadcast another state advertising message indicating that media device 106 has connected to a remote keyboard. Thus, in response to receiving the state advertising message indicating that media device 106 has connected to a remote keyboard, the other user devices (e.g., user device 102b, user device 102n, etc.) can dismiss (e.g., hide, remove from display) their respective keyboard notifications.

In some implementations, media device 106 can send user device 102a information describing the required text input. For example, after establishing the bidirectional communication session through network 112, operating system 108 of media device 106 can send operating system 104a of user device 102a information describing the text input to be provided by the user through the remote keyboard. For example, the information can include a prompt for the text input field (e.g., "Enter user name:", "Enter password:", "Enter search query:", etc.). The information can include an identification or representation for application 110 or operating system 108. For example, the information can include an image, icon, or graphic representing the application 110 or the manufacturer of operating system 108. Operating system 104a can then use this information to present a text input control and/or virtual keyboard on a display of user device 102a, as described further below. Alternatively, this information can be obtained from the state advertising message received by user device 102a, as described above.

In some implementations, operating system 104a can send virtual keyboard input to media device 106. For example, operating system 104a can detect when the user provides input selecting characters or other graphical elements presented on the virtual keyboard. After detecting each input, operating system 104a can send a message to operating system 108 identifying the selected character or graphical element. For example, operating system 104a can send each character or graphical element individually as they are selected so that operating system 108 and/or application 110 can respond to each keyboard input appropriately (e.g., by presenting search results, moving between text input controls, etc.). For example, operating system 108 can send the keyboard input to application 110 so that application 110 can respond to the keyboard input according to the programming of application 110. In some implementations, the keyboard service provided by user device 102a can be terminated after the user provides input indicating that the user has finished providing textual input to the selected control. For example, the keyboard service can be terminated and the virtual keyboard dismissed or hidden when the user selects a graphical element (e.g., "enter" key, "done" element, etc.) on the virtual keyboard.

In some implementations, operating system 104a can wait a period of time before terminating the remote virtual keyboard service. For example, even though the user may have finished providing input to a text control presented by media device 106, operating system 104a can continue presenting the virtual keyboard for a period of time (e.g., 5 seconds, 7 seconds, etc.) after the last input to allow the user to provide input to additional text controls presented by media device 106. Thus, the user does not have to be burdened with invoking the virtual keyboard again if additional textual input is required by media device 106.

Figure 2:
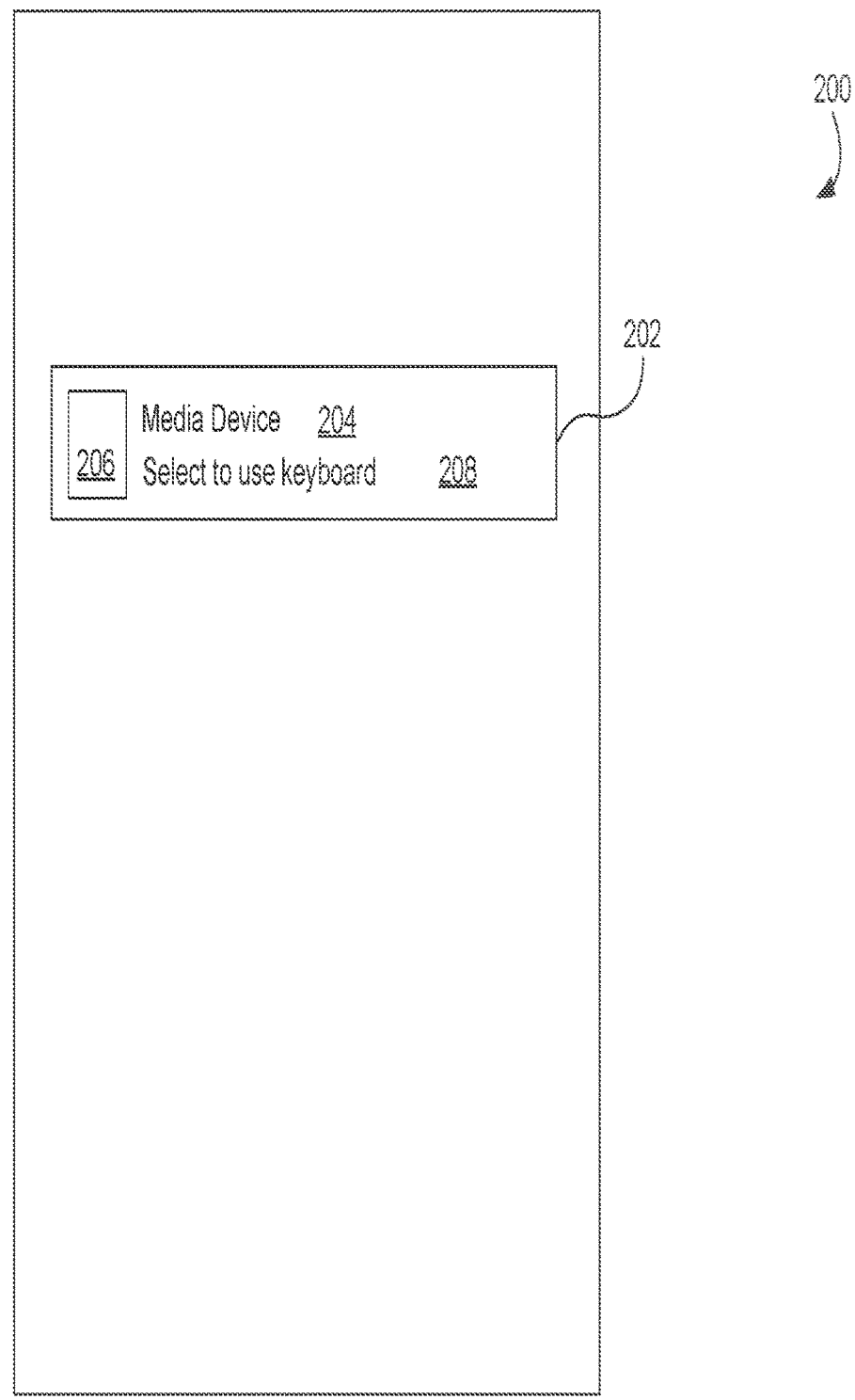
FIG. 2 illustrates an example graphical user interface for presenting a remote keyboard notification on a user device.

FIG. 2 illustrates an example graphical user interface 200 for presenting a remote keyboard notification 202 on user device 102a. For example, notification 202 can be a graphical element presented by operating system 104a on a display of user device 102a in response to receiving a state advertising message indicating that a text input control is selected on media device 106, as described above. Notification 202 can be presented on each user device 102 that receives the state advertising message. Notification 202 can include, for example, description 204 and/or image 206 representing media device 106 and/or application 110. Notification 202 can include prompt 208 describing how to invoke the virtual keyboard on user device 102a. For example, the user can invoke the virtual keyboard by selecting (e.g., long touch, pressure touch, tap, swipe, etc.) notification 202.

In some implementations, the user devices 102 (e.g., user device 102a, user device 102b, . . . user device 102n) can present keyboard notification 202 on GUI 200 of user device 102a when user device 102a is locked. For example, GUI 200 can be a lock screen of user device 102a. GUI 200 can be a home screen of user device 102a when user device 102a is unlocked (e.g., the user has been authenticated as the user of user device 102a).

Figure 3:
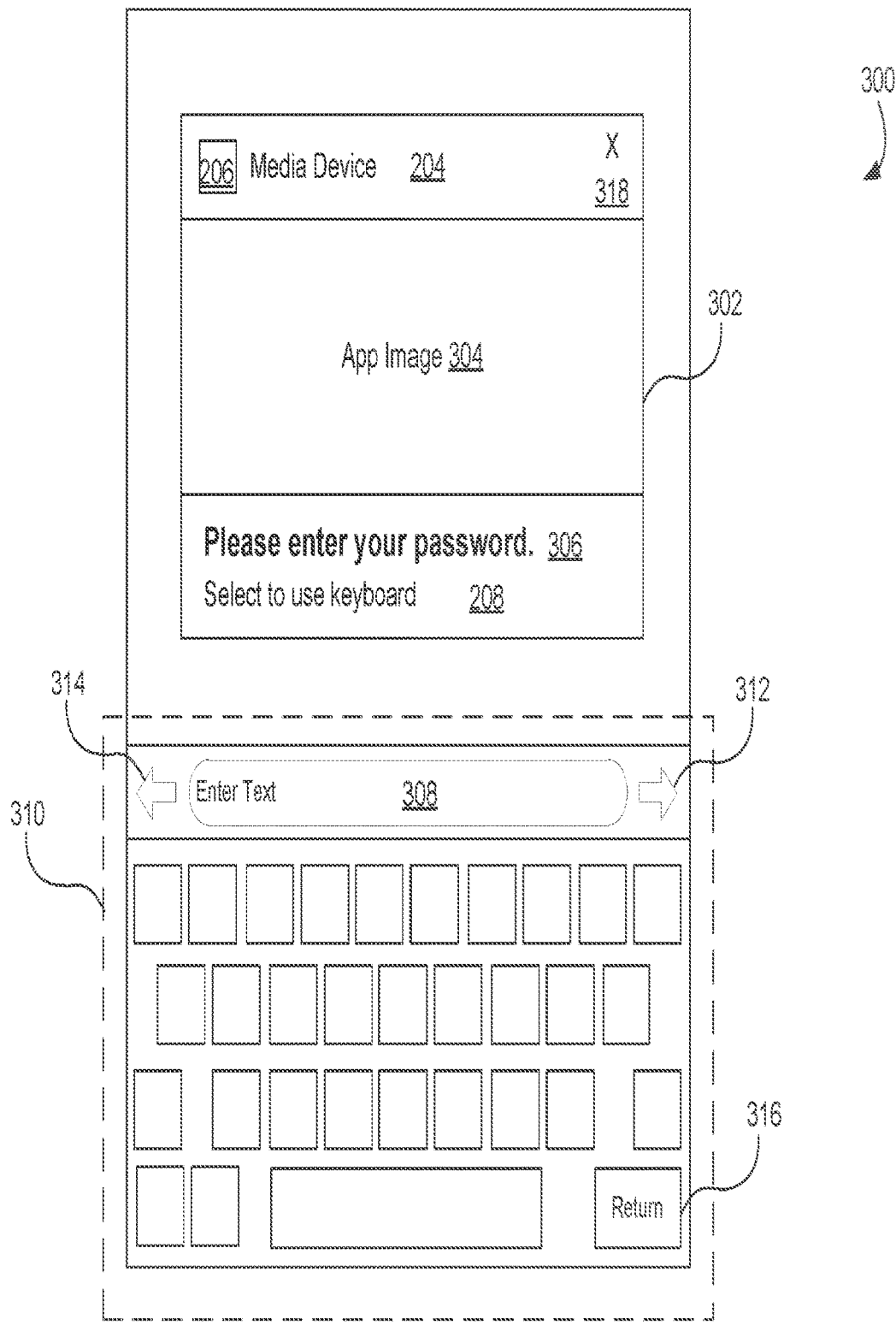
FIG. 3 illustrates an example graphical user interface for presenting a virtual keyboard on a user device.

FIG. 3 illustrates an example graphical user interface 300 for presenting a virtual keyboard on user device 102a. For example, GUI 300 can be presented by operating system 104a on a display of user device 102a in response to the user selecting notification 202, as described above with reference to GUI 200 of FIG. 2. In some implementations, user device 102a can present graphical element 302 representing application 110 and/or media device 106. For example, graphical element 302 can include description 204 and/or image 206 representing the media device 106. When the selected text input control is associated with application 110, graphical element 302 can include a graphical representation 304 (e.g., an image, icon, graphic, etc.) of application 110.

In some implementations, graphical element 302 can include prompt 306 describing the text input the user should provide. For example, prompt 306 can include an instruction to "enter your password" or "enter search term," etc. In some implementations, graphical element 302 can include prompt instruction 308 describing how to invoke the virtual keyboard on user device 102a. For example, prompt 308 can include an instruction to provide a tap, swipe, long touch, or pressure touch gesture to graphical element 302 to invoke the virtual keyboard.

In some implementations, GUI 300 can include virtual keyboard 310. For example, virtual keyboard 310 can be presented on GUI 300 in response to the user selecting graphical element 302 to invoke virtual keyboard 310. Virtual keyboard 310 can be presented in response to user device 102a receiving the input specified by prompt 208, for example. Virtual keyboard can, for example, include a typical virtual keyboard layout for selecting characters. In some implementations, GUI 300 can be presented without graphical element 302. For example, virtual keyboard 310 can be presented as in GUI 300 of FIG. 3 but without graphical element 302.

In some implementations, user device 102a can present virtual keyboard 310 in response to detecting motion. For example, user device 102a can present notification 202 on GUI 200 of FIG. 2. When the user picks up user device 102a to view notification 202, user device 102a can detect the motion of user device 102a (e.g., with a built in motion sensor, accelerometer, etc.), and operating system 104a automatically present virtual keyboard 310 on a display of user device 102a. For example, in response to detecting the movement of user device 102a, operating system 104a can present GUI 300 of FIG. 3. Thus, the user of user device 102a can invoke virtual keyboard 310 simply by picking up user device 102a.

In some implementations, virtual keyboard 310 can include text control 308. For example, as the user selects characters presented on virtual keyboard 310, the selected characters can be represented on text control 308. Since, as described above, the characters are also sent to media device 106 as they are selected on virtual keyboard 310, both user device 102a and media device 106 may present similar character strings based on which characters the user has selected. Thus, the user does not have to divert the user's attention from the display of user device 102a while entering text but can compare the text entered on user device 102a with the text received by media device 106 when needed.

In some implementations, virtual keyboard 310 can include graphical elements 312 and/or 314 for navigating between text controls (e.g., text input boxes, text input fields, etc.) presented on the display of media device 106. For example, operating system 108 or application 110 on media device 106 may require text input to multiple text input controls. Operating system 108 or application 110 may require the user's user name and password, for example. The user can select graphical element 312 to select the next text input control. The user can select graphical element 314 to select the previous text input control.

In some implementations, virtual keyboard 310 can include graphical element 316 for indicating that the user has finished providing text input. For example, the user can select graphical element 316 to indicate that the user is finished providing input to the current text control. When the user selects graphical element 316, user device 102a can send a message to media device 106 to cause another (e.g., the next) text input control to be selected on media device 106. When the user selects graphical element 316, user device 102a can send a message to media device 106 to terminate the remote virtual keyboard service. Alternatively, the user can select graphical element 318 to terminate the remote virtual keyboard service and dismiss graphical element 302 and virtual keyboard 310. However, in some implementations, termination of the service may be delayed to allow for selection of additional text input controls on media device 106 and provision of additional text input, as described above.

Figure 4:
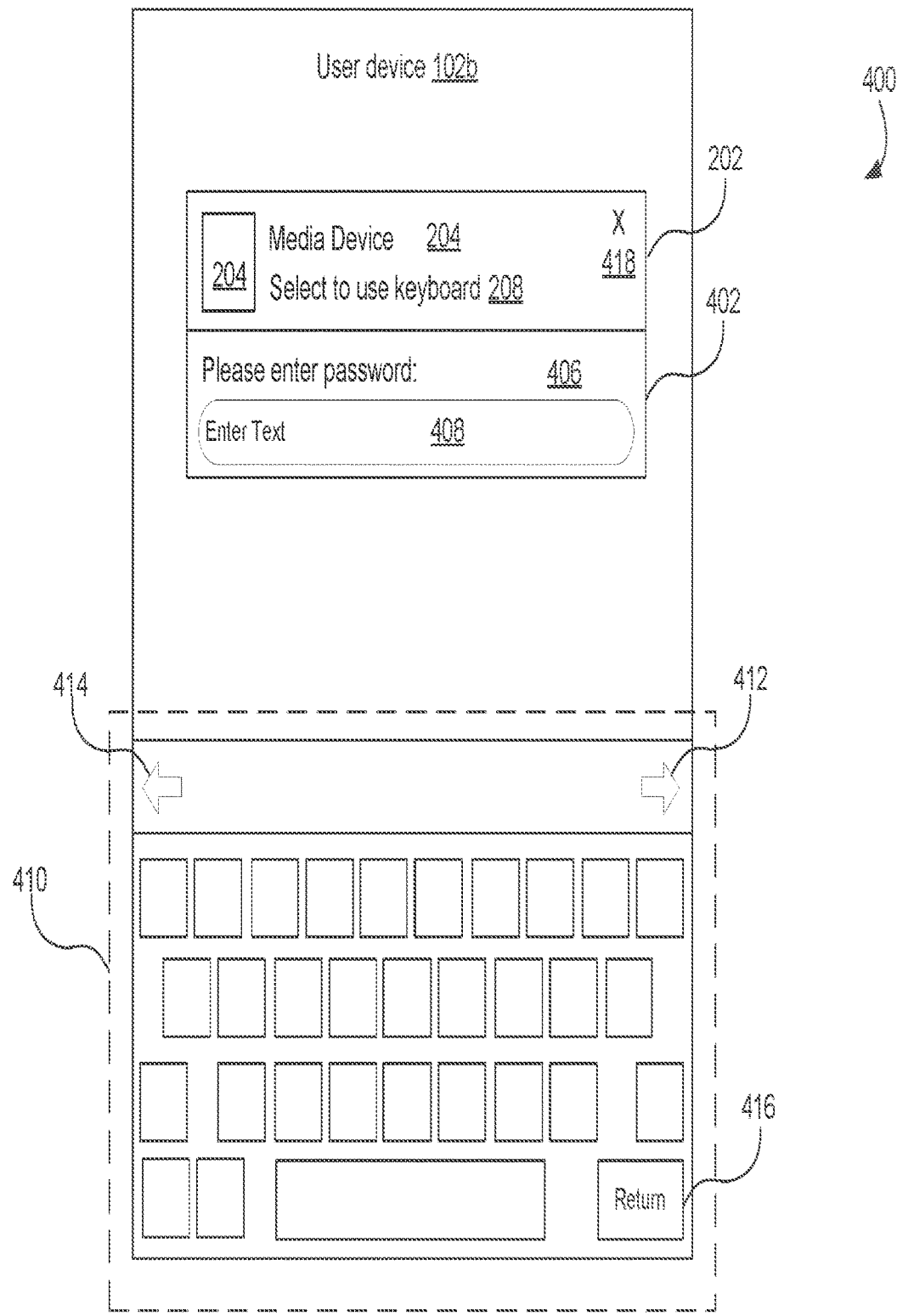
FIG. 4 illustrates an example graphical user interface for presenting a virtual keyboard on a user device.

FIG. 4 illustrates an example graphical user interface 400 for presenting a virtual keyboard on a user device. For example, GUI 400 can be presented by operating system 104a on a display of user device 102a in response to the user selecting notification 202 of FIG. 2. GUI 400 can, for example, be presented as an alternative to GUI 300 based on the features (or lack thereof) provided by various user devices 102. For example, if user device 102a is configured with a pressure touch input feature, user device 102a can present GUI 300. If user device 102a is not configured with a pressure touch input feature, user device 102a can present GUI 400.

In some implementations, GUI 400 can include graphical element 402 for presenting text input. For example, graphical element 402 can be presented in response to a selection of notification 202. Graphical element 402 can be presented adjacent to or abutted to notification 202. Graphical element 402 can include prompt 406. For example, prompt 406 can provide instructions to the user describing what type of information the user should provide to the selected text input control. Graphical element 402 can include text input control 408. For example, text input control 408 can present the text input provided by the user using the virtual keyboard, as described above.

In some implementations, GUI 400 can include virtual keyboard 410. For example, virtual keyboard 410 can be presented on GUI 400 in response to the user selecting graphical element 402. Virtual keyboard 410 can be presented simultaneously or near simultaneously with graphical element 402, for example. Virtual keyboard 310 can be presented in response to user device 102a receiving the input specified by prompt 208, for example. Virtual keyboard 410 can include a typical virtual keyboard layout for selecting characters.

In some implementations, virtual keyboard 410 can include graphical elements 412 and/or 414 for navigating between text controls (e.g., text input boxes, text input fields, etc.) presented on the display of media device 106. For example, operating system 108 or application 110 on media device 106 may require text input to multiple text input controls. Operating system 108 or application 110 may require the user's user name and password, for example. The user can select graphical element 412 to select the next text input control. The user can select graphical element 414 to select the previous text input control.

In some implementations, virtual keyboard 410 can include graphical element 416 for indicating that the user has finished providing text input. For example, the user can select graphical element 416 to indicate that the user is finished providing input to the current text control. When the user selects graphical element 416, user device 102a can send a message to media device 106 to cause another (e.g., the next) text input control to be selected on media device 106. When the user selects graphical element 416, user device 102a can send a message to media device 106 to terminate the remote virtual keyboard service. Alternatively, the user can select graphical element 418 to terminate the remote virtual keyboard service and dismiss graphical element 402 and virtual keyboard 410. However, in some implementations, termination of the service may be delayed to allow for selection of additional text input controls on media device 106 and provision of additional text input, as described above.

Example Processes

Figure 5:
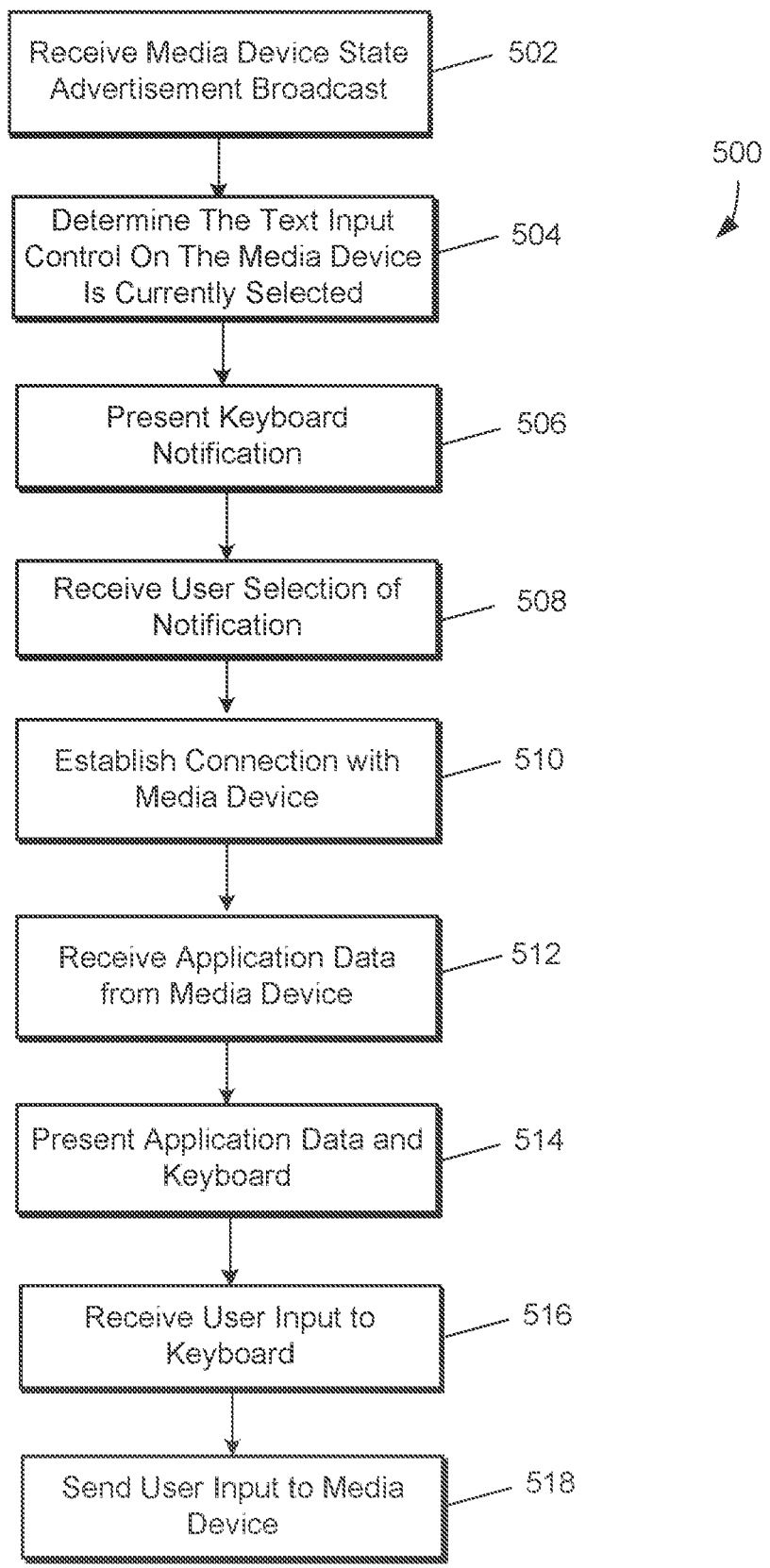
FIG. 5 is a flow diagram of an example process for providing a remote keyboard service on a user device.

FIG. 5 is a flow diagram of an example process 500 for providing a remote keyboard service on a user device. More specifically, process 500 described herein is an approach for providing a remote keyboard service from a user device to a media device (or any other type of computing device). A user device that implements process 500 can provide a remote keyboard service and present a remote keyboard without invoking a user application (e.g., remote control application 104a) on the user device. Process 500 can be handled efficiently by the operating system and makes the remote keyboard service available regardless of applications installed on the user device and irrespective of the locked or unlocked state of the user device.

At step 502, user device 102a can receive a state advertisement message broadcast from media device 106. For example, the state advertisement message can identify the media device and include data describing the current state of the media device. According to implementations described herein, the state advertisement message can include data indicating that a text input control presented by media device 106 is currently selected. Alternatively, the state advertisement message can include data indicating that media device 106 is requesting a connection to a remote keyboard.

At step 504, user device 102a can determine the text input control on the media device is currently selected. For example, based on the state advertisement message received at step 502, user device 102a can determine that a text input control on media device 106 is currently selected.

At step 506, user device 102a can present the remote keyboard notification. For example, in response to determining that a text input control on media device 106 is currently selected, user device 102a can present a graphical keyboard notification prompting the user to invoke a virtual keyboard on user device 102a. For example, when the user has user device 102a (e.g., smartphone), user device 102b (e.g., laptop) and user device 102n (e.g., tablet) all within the broadcasting range of media device 106, each of these devices can determine the text input control on the media device is currently selected based on the state advertisement message and present the graphical notification prompting the user to invoke the virtual keyboard on each of these user devices.

At step 508, user device 102a can receive the user's selection of the notification. For example, user device 102a can receive user input (e.g., tap, swipe, long touch, pressure touch, etc.) to the notification selecting the notification. In some implementations, the first device the user selects (e.g., the user might tap the graphical notification to invoke the virtual keyboard on that device) will present the remote keyboard on the selected device for the user to input the text into the text field on media device 106. The rest of the devices will dismiss the graphical notification from their screen but still keep the notification in those devices.

At step 510, user device 102a can establish a connection with media device 106. As we discussed above, after the user selects the notification on user device 102a by tapping or clicking the notification, user device 102a can establish a bidirectional communication session with media device 106 through communication network 112. For example, user device 102a can establish the session with media device 106 through network 112 because communication session through network 112 may allow for the transmission of more data than the state advertisement message.

At step 512, user device 102a can receive application data from the media device 106. For example, after establishing a communication session with media device 106, media device 106 can send application data to user device 102a. For example, the application data can include media device data, such as description 204 and/or image 206 representing the media device 106. The application data may include a graphical representation 304 of application 110 and/or prompt 306 (e.g., please enter your password) from application 110, as shown in FIG. 3.

At step 514, user device 102a can present the device data, application data and/or keyboard on a display of user device 102a. For example, after receiving the device data and/or application data, user device 102a can present the device data and/or application data, as shown in FIG. 3.

At step 516, user device 102a can receive user input to the virtual keyboard presented on the user device. For example, the user input can be a selection of a single character or other object (such as graphical elements 312 and/or 314 for navigating between text controls) presented on the virtual keyboard.

At step 518, user device 102a can send the user input to media device 106. For example, user device 102a can send the user input to the media device 106 through communication network 112. For example, after step 518 process 500 can return to step 516. Steps 516 and 518 can be repeated until the user has finished providing input to the virtual keyboard. Thus, media device 106 can respond to each keyboard input as if the keyboard was directly connected to or part of media device 106.

Figure 6:
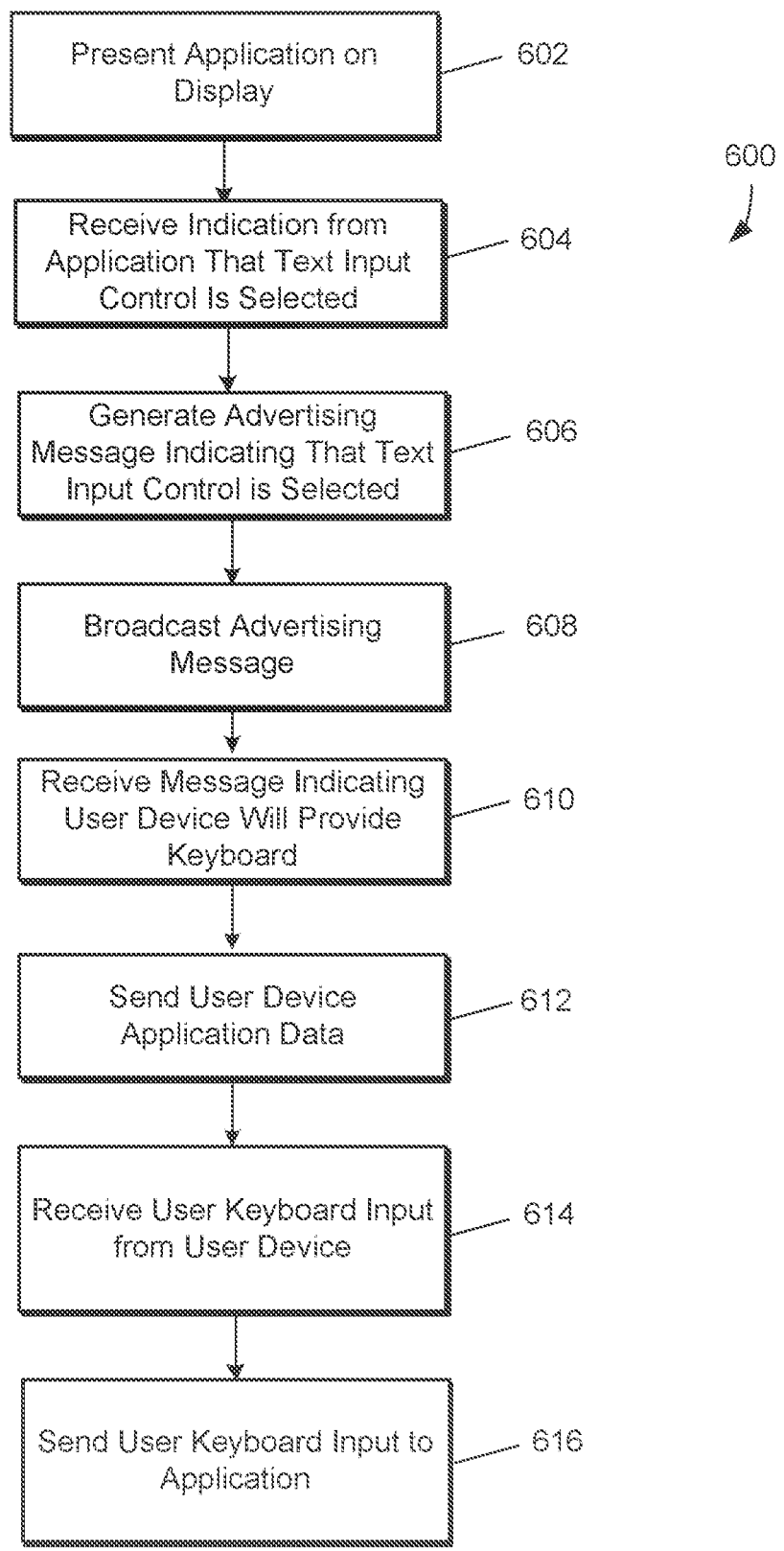
FIG. 6 is a flow diagram of an example process for requesting a remote keyboard service from user devices.

FIG. 6 is a flow diagram of an example process 600 for requesting a remote keyboard service from user devices. More specifically, the process 600 described herein is an approach for advertising the need for a remote keyboard so that the user can select the most convenient device for invoking the remote keyboard, as described above.

At step 602, media device 106 can present application 110 on a display associated with media device 106. In some implementations, media device 106 can be configured with a variety of media applications for presenting media items to the user. The user may invoke application 110 on media device 106 using a remote control device. Application 110 can present a graphical user interface that allows the user to control application 110. For example, application 110 can present graphical user interfaces that allow the user to browse, search, and view media items available through application 110.

At step 604, media device 106 can receive the indication from application 110 that the text input control is selected. For example, while interacting with application 110, application 110 may require the user to provide text input. Application 110 may require a user name and password. Application 110 may require search parameters for performing a search for media. In either case, application 110 can present and the user can select (e.g., using remote control device 120), a text input control presented by application 110. When a text input control is selected, application 110 can send a message (e.g., using the aforementioned API) to operating system 108 on media device 106 indicating that a text input control has been selected and/or providing a description of the information required by the text input control. In some implementations, the message can include an identifier for application 110 and/or other application metadata, such as graphical representation 304.

At step 606, media device 106 can generate the advertising message indicating that the text input control is selected. In some implementations, media device 106 can generate a state advertising message including state information indicating that the text input control presented by application 110 is selected. For example, in response to receiving the message from application 110 at step 604, operating system 108 can generate a state advertising message that includes data indicating that a text input control is currently selected on media device 106.

At step 608, media device 106 can broadcast the state advertising message. In some implementations, after media device 106 generates the state advertising message indicating that the text input control is selected, media device 106 can broadcast the state advertisement message. For example, the advertising message can be broadcast without identifying a specific recipient device. Thus, all user devices within the broadcasting range of media device 106 may receive the state advertising message.

At step 610, media device 106 can receive a message indicating that a user device will provide the remote keyboard for the media device. For example, after all user devices 102 within the broadcasting range of media device 106 receive the media device state advertisement broadcast from media device 106, media device 106 can receive a message indicating that user device 102a will provide the remote keyboard for media device 106. For example, the message can be sent to media device 106 through network 112. The message can initiate a bidirectional communication session between media device 106 and user device 102a so that media device 106 and user device 102a can exchange data related to the text input control.

At step 612, media device 106 can send user device 102a application data. For example, the application data may include device data, such as description 204 and/or image 206 representing the media device (e.g., the media device 106). The application data may include a graphical representation 304 of application 110 and/or prompt 306 (e.g., please enter your password) from application 110, as shown in FIG. 3. The application data can be received from application 110 by operating system 108, as described above in step 604.

At step 614, media device 106 can receive the user's keyboard input from the user device 102a. For example, when user device 102a receives user input selecting characters and/or other objects on the remote keyboard (e.g., keyboard 310, keyboard 410) presented on user device 102a, user device 102a can send the user input (e.g., selected characters or other objects) to media device 106.

At step 616, media device 106 can send the user's keyboard input to application 110. For example, after receiving the user's keyboard input from user device 102a, operating system 108 can send the keyboard input to application 110. Application 110 can then perform an operation according to the purpose of the selected text control. For example, if the currently selected text control is configured to receive user name and/or password input, then application 110 can process the keyboard input to determine whether the entered user name and/or password are correct for the user. If the currently selected text control is configured to receive search parameters, then application 110 can process the keyboard input by performing a search after each character is entered by the user.

Since media device 106 receives and processes each keyboard input (e.g., character selection, object selection, etc.) as the input is received, process 600 can return the step 614 to receive the next keyboard input and 616 to process the next keyboard input. Thus, process 600 can repeat steps 614 and 616 until the user has finished providing input to the selected text control.

Moreover, while process 600 describes receiving text input for application 110, process 600 can be implemented to receive text input for operating system 108 as well. For example, application 110 can be replaced in process 600 with operating system 108 to obtain a remote keyboard service for operating system 108 and receive text input for a text input control presented by operating system 108.

Graphical User Interfaces

This disclosure above describes various Graphical User interfaces (GUIs) for implementing various features, processes or workflows. These GUIs can be presented on a variety of electronic devices including but not limited to laptop computers, desktop computers, computer terminals, television systems, tablet computers, e-book readers and smart phones. One or more of these electronic devices can include a touch-sensitive surface. The touch-sensitive surface can process multiple simultaneous points of input, including processing data related to the pressure, degree or position of each point of input. Such processing can facilitate gestures with multiple fingers, including pinching and swiping.

When the disclosure refers to "select" or "selecting" user interface elements in a GUI, these terms are understood to include clicking or "hovering" with a mouse or other input device over a user interface element, or touching, tapping or gesturing with one or more fingers or stylus on a user interface element. User interface elements can be virtual buttons, menus, selectors, switches, sliders, scrubbers, knobs, thumbnails, links, icons, radio buttons, checkboxes and any other mechanism for receiving input from, or providing feedback to a user.

Privacy

The present disclosure recognizes that the use of such personal information data, in the present technology, can be used to the benefit of users. For example, the personal information data can be used to deliver targeted content that is of greater interest to the user. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

Example System Architecture

Figure 7:
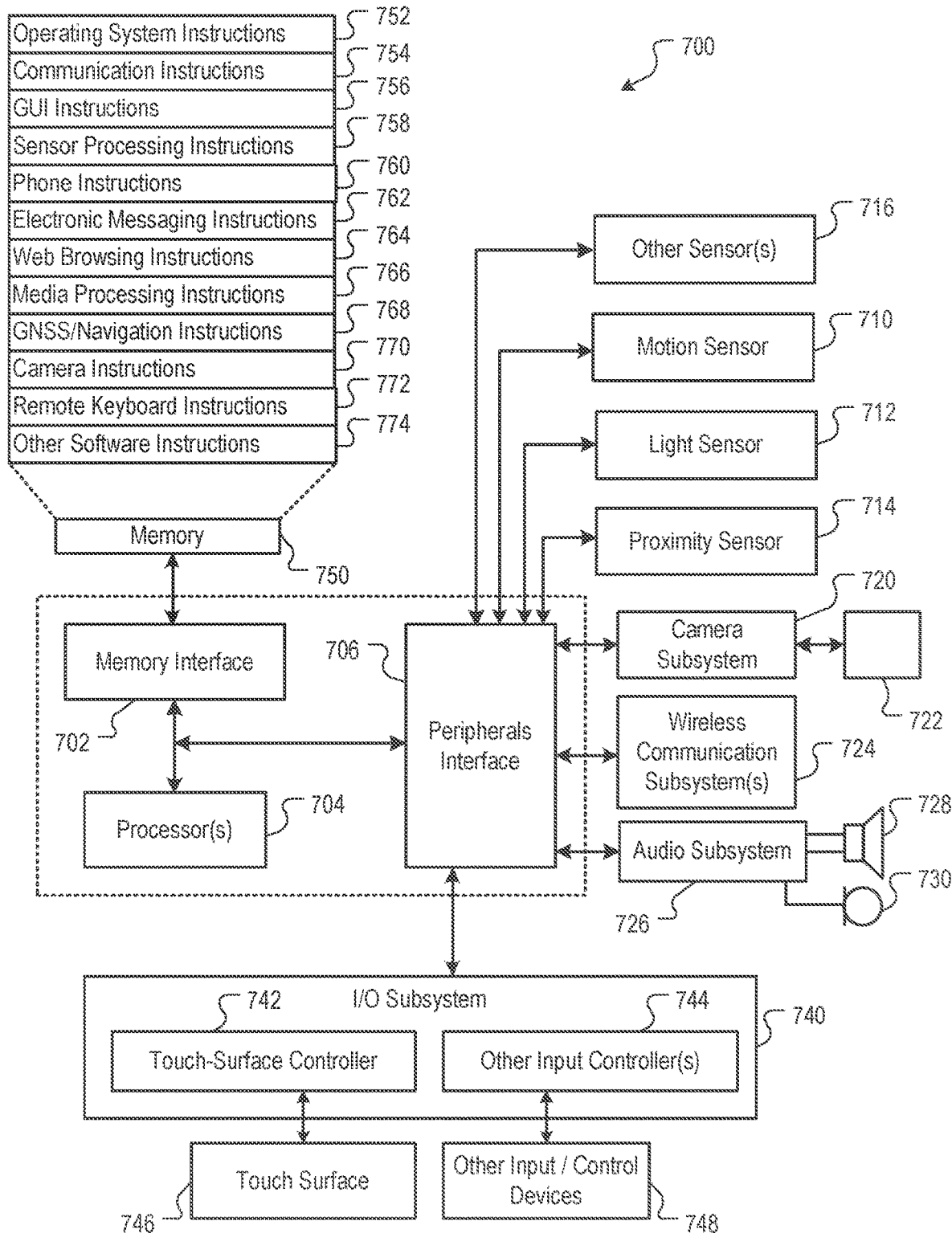
FIG. 7 is a block diagram of an example computing device that can implement the features and processes of FIGS. 1-6.

FIG. 7 is a block diagram of an example computing device 700 that can implement the features and processes of FIGS. 1-6. The computing device 700 can include a memory interface 702, one or more data processors, image processors and/or central processing units 704, and a peripherals interface 706. The memory interface 702, the one or more processors 704 and/or the peripherals interface 706 can be separate components or can be integrated in one or more integrated circuits. The various components in the computing device 700 can be coupled by one or more communication buses or signal lines.

Sensors, devices, and subsystems can be coupled to the peripherals interface 706 to facilitate multiple functionalities. For example, a motion sensor 710, a light sensor 712, and a proximity sensor 714 can be coupled to the peripherals interface 706 to facilitate orientation, lighting, and proximity functions. Other sensors 716 can also be connected to the peripherals interface 706, such as a global navigation satellite system (GNSS) (e.g., GPS receiver), a temperature sensor, a biometric sensor, magnetometer or other sensing device, to facilitate related functionalities.

A camera subsystem 720 and an optical sensor 722, e.g., a charged coupled device (CCD) or a complementary metal-oxide semiconductor (CMOS) optical sensor, can be utilized to facilitate camera functions, such as recording photographs and video clips. The camera subsystem 720 and the optical sensor 722 can be used to collect images of a user to be used during authentication of a user, e.g., by performing facial recognition analysis.

Communication functions can be facilitated through one or more wireless communication subsystems 724, which can include radio frequency receivers and transmitters and/or optical (e.g., infrared) receivers and transmitters. The specific design and implementation of the communication subsystem 724 can depend on the communication network(s) over which the computing device 700 is intended to operate. For example, the computing device 700 can include communication subsystems 724 designed to operate over a GSM network, a GPRS network, an EDGE network, a Wi-Fi or WiMax network, and a Bluetooth™ network. In particular, the wireless communication subsystems 724 can include hosting protocols such that the device 100 can be configured as a base station for other wireless devices.

An audio subsystem 726 can be coupled to a speaker 728 and a microphone 730 to facilitate voice-enabled functions, such as speaker recognition, voice replication, digital recording, and telephony functions. The audio subsystem 726 can be configured to facilitate processing voice commands, voiceprinting and voice authentication, for example.

The I/O subsystem 740 can include a touch-surface controller 742 and/or other input controller(s) 744. The touch-surface controller 742 can be coupled to a touch surface 746. The touch surface 746 and touch-surface controller 742 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 746.

The other input controller(s) 744 can be coupled to other input/control devices 748, such as one or more buttons, rocker switches, thumb-wheel, infrared port, USB port, and/or a pointer device such as a stylus. The one or more buttons (not shown) can include an up/down button for volume control of the speaker 728 and/or the microphone 730.

In one implementation, a pressing of the button for a first duration can disengage a lock of the touch surface 746; and a pressing of the button for a second duration that is longer than the first duration can turn power to the computing device 700 on or off. Pressing the button for a third duration can activate a voice control, or voice command, module that enables the user to speak commands into the microphone 730 to cause the device to execute the spoken command. The user can customize a functionality of one or more of the buttons. The touch surface 746 can, for example, also be used to implement virtual or soft buttons and/or a keyboard.

In some implementations, the computing device 700 can present recorded audio and/or video files, such as MP3, AAC, and MPEG files. In some implementations, the computing, device 700 can include the functionality of an MP3 player, such as an iPod™. The computing device 700 can, therefore, include a 36-pin connector that is compatible with the iPod. Other input/output and control devices can also be used.

The memory interface 702 can be coupled to memory 750. The memory 750 can include high-speed random access memory and/or iron-volatile; memory, such as one or more magnetic disk storage devices, one or more optical storage devices, and/or flash memory (e.g., NAND, NOR). The memory 750 can store an operating system 752, such as Darwin, RTXC, LINUX, UNIX, OS X, WINDOWS, or an embedded operating system such as VxWorks.

The operating system 752 can include instructions for handling basic system services and for performing hardware dependent tasks. In some implementations, the operating system 752 can be a kernel (e.g., UNIX kernel). In some implementations, the operating system 752 can include instructions for performing voice authentication. For example, operating system 752 can implement the remote keyboard features as described with reference to FIGS. 1-6.

The memory 750 can also store communication instructions 754 to facilitate communicating with one or more additional devices, one or more computers and/or one or more servers. The memory 750 can include graphical user interface instructions 756 to facilitate graphic user interface processing; sensor processing instructions 758 to facilitate sensor-related processing and functions; phone instructions 760 to facilitate phone-related processes and functions; electronic messaging instructions 762 to facilitate electronic-messaging related processes and functions; web browsing instructions 764 to facilitate web browsing-related processes and functions; media processing instructions 766 to facilitate media processing-related processes and functions; GNSS/Navigation instructions 768 to facilitate GNSS and navigation-related processes and instructions; and/or camera instructions 770 to facilitate camera-related processes and functions.

The memory 750 can store other software instructions 772 to facilitate other processes and functions, such as the remote keyboard processes and functions as described with reference to FIGS. 1-6.

The memory 750 can also store other software instructions 774, such as web video instructions to facilitate web video-related processes and functions; and/or web shopping instructions to facilitate web shopping-related processes and functions. In some implementations, the media processing instructions 766 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. The memory 750 can include additional instructions or fewer instructions. Furthermore, various functions of the computing device 700 can be implemented in hardware and/or in software, including in one or more signal processing and/or application specific integrated circuits.

The invention claimed is:

1. A method comprising:
responsive to determining that text input is to be entered:
broadcasting, by a computing device, a state advertisement message, the state advertisement message indicating that the text input is to be entered;
subsequent to broadcasting the state advertisement message, establishing, by the computing device, a bidirectional communication channel with a user device;
receiving, by the computing device from the user device via the bidirectional communication channel, user input; and
providing, by the computing device to an application operating on the computing device, the text input based on the user input.

2. The method as recited in claim 1, further comprising determining that the text input is to be entered by at least receiving, by the computing device, a request from the application operating on the computing device for the text input.

3. The method as recited in claim 1, wherein the state advertisement message comprises state information indicating a purpose of the text input.

4. The method as recited in claim 1, further comprising, prior to receiving the user input:
receiving, by the computing device from the user device, a message indicating that the user device will provide the text input.

5. The method as recited in claim 4, further comprising, in response to receiving the message indicating that the user device will provide the text input:
sending, by the computing device, information to the user device, the information describing any of: an application requesting the text input, the computing device, and a purpose of the text input.

6. The method as recited in claim 1, wherein determining that the text input is to be entered comprises determining, by the computing device, that a text input control is currently selected in the application operating on the computing device.

7. The method as recited in claim 1, wherein the state advertisement message comprises a graphical notification prompting a user to invoke a virtual keyboard on the user device, the graphical notification comprising a graphical representation of a requester of the text input.

8. A system comprising:
one or more processors; and
a non-transitory computer-readable medium including one or more sequences of instructions that, when executed by the one or more processors, causes:
responsive to determining that text input is to be entered: broadcasting, by a computing device, a state advertisement message, the state advertisement message indicating that the text input is to be entered;
subsequent to broadcasting the state advertisement message, establishing, by the computing device, a bidirectional communication channel with a user device;
receiving, by the computing device from the user device via the bidirectional communication channel, user input; and
providing, by the computing device to an application operating on the computing device, the text input based on the user input.

9. The system as recited in claim 8, wherein the instructions further cause determining that the text input is to be entered by at least receiving, by the computing device, a request from the application operating on the computing device for the text input.

10. The system as recited in claim 8, wherein the state advertisement message comprises state information indicating a purpose of the text input.

11. The system as recited in claim 8, wherein the instructions further cause, prior to receiving the user input:
receiving, by the computing device from the user device, a message indicating that the user device will provide the text input.

12. The system as recited in claim 11, wherein the instructions further cause, in response to receiving the message indicating that the user device will provide the text input:
    sending, by the computing device, information to the user device, the information describing any of: an application requesting the text input, the computing device, and a purpose of the text input.

13. The system as recited in claim 8, wherein the instructions that cause determining that the text input is to be entered further comprises determining, by the computing device, that a text input control is currently selected in the application operating on the computing device.

14. The system as recited in claim 8, wherein the state advertisement message comprises a graphical notification prompting a user to invoke a virtual keyboard on the user device, the graphical notification comprising a graphical representation of a requester of the text input.

15. A non-transitory computer-readable medium comprising one or more sequences of instructions that, when executed by one or more processors, causes:
    responsive to determining that text input is to be entered:
        broadcasting, by a computing device, a state advertisement message, the state advertisement message indicating that the text input is to be entered;
    subsequent to broadcasting the state advertisement message, establishing, by the computing device, a bidirectional communication channel with a user device;
    receiving, by the computing device from the user device via the bidirectional communication channel, user input; and
    providing, by the computing device to an application operating on the computing device, the text input based on the user input.

16. The non-transitory computer-readable medium as recited in claim 15, wherein the instructions further cause determining that the text input is to be entered by at least receiving, by the computing device, a request from the application operating on the computing device for the text input.

17. The non-transitory computer-readable medium as recited in claim 15, wherein the state advertisement message comprises state information indicating a purpose of the text input.

18. The non-transitory computer-readable medium as recited in claim 15, wherein the instructions further cause, prior to receiving the user input:
    receiving, by the computing device from the user device, a message indicating that the user device will provide the text input; and
    in response to receiving the message indicating that the user device will provide the text input:
    sending, by the computing device, information to the user device, the information describing any of: an application requesting the text input, the computing device, and a purpose of the text input.

19. The non-transitory computer-readable medium as recited in claim 15, wherein the instructions that cause determining that the text input is to be entered further comprises determining, by the computing device, that a text input control is currently selected in the application operating on the computing device.

20. The non-transitory computer-readable medium as recited in claim 15, wherein the state advertisement message comprises a graphical notification prompting a user to invoke a virtual keyboard on the user device, the graphical notification comprising a graphical representation of a requester of the text input.

* * * * *